(12) United States Patent
Wallace

(10) Patent No.: US 6,832,632 B1
(45) Date of Patent: Dec. 21, 2004

(54) BOOST VALVE ASSEMBLY

(75) Inventor: Benjamin A. Wallace, Saxtons River, VT (US)

(73) Assignee: Sonnax Industries, Inc., Bellows Falls, VT (US)

(*) Notice: Subject to any disclaimer, the term of this patent is extended or adjusted under 35 U.S.C. 154(b) by 0 days.

(21) Appl. No.: 10/350,734

(22) Filed: Jan. 23, 2003

Related U.S. Application Data

(60) Provisional application No. 60/350,083, filed on Jan. 23, 2002.

(51) Int. Cl.$^7$ ............................................. F15B 13/042
(52) U.S. Cl. ................................................ 137/625.66
(58) Field of Search ..................................... 137/625.66

(56) References Cited

U.S. PATENT DOCUMENTS

| | | | | |
|---|---|---|---|---|
| 4,506,564 A | * | 3/1985 | Coutant | ....................... 477/158 |
| 6,543,472 B2 | | 4/2003 | Stafford | .................... 137/454.2 |
| 6,585,002 B2 | | 7/2003 | Stafford | .................... 137/454.2 |
| 6,619,323 B1 | * | 9/2003 | Stafford | ................. 137/625.69 |

OTHER PUBLICATIONS

U.S. patent application Ser. No. 60/315,180.*

* cited by examiner

Primary Examiner—Gerald A. Michalsky
(74) Attorney, Agent, or Firm—Clifford F. Rey

(57) ABSTRACT

A direct replacement boost valve assembly for use in combination with a pressure regulator valve within the valve body of an automatic transmission is disclosed. The boost valve assembly functions to boost line pressure during high load conditions in response to torque signal fluid pressure, which is proportional to engine torque. The present boost valve assembly is comprised of hard-anodized aluminum valve pistons, which are disposed within a wear resistant aluminum sleeve for maximum service longevity. Annular lubrication grooves formed in the valve pistons which comprise the boost valve assembly retain a lubricating film of transmission fluid to center the valve pistons within the sleeve ensuring accurate operation and reducing mechanical wear. The present valve sleeve features a fluid inlet port system, which increases the delivery of torque signal fluid pressure to the boost valve in order to restore its function to original factory boost ratios and specifications.

15 Claims, 7 Drawing Sheets

US 6,832,632 B1

BOOST VALVE ASSEMBLY

CROSS-REFERENCE TO RELATED APPLICATION

This application claims the benefit under 35 U.S.C. 119(e) of U.S. Provisional Patent Application No. 60/350,083 filed Jan. 23, 2002 now abandoned, entitled Boost Valve Assembly.

BACKGROUND OF INVENTION

The present invention relates generally to the field of hydraulic circuits utilized in automatic transmission systems and, more particularly, to a replacement Boost Valve Assembly for use in a General Motors 4T65E transmission, which is utilized to boost hydraulic pressure during high load conditions.

Automatic transmission systems of the prior art have a hydraulic circuit sub-system which includes at least a hydraulic pump, a valve body having fluid conducting passages or circuits, input and exhaust ports formed within the fluid circuits, and a plurality of spool valves so-called because of their resemblance to sewing-thread type spools. Such valves are comprised of generally cylindrical pistons having control diameters or lands formed thereon, which alternately open and close the ports to the fluid circuits to regulate the flow and pressure of automatic transmission fluid (hereinafter "ATF") in order to actuate different components of the transmission. It will be understood that in describing hydraulic circuits, ATF usually changes names when it passes through an orifice or control valve in a specific fluid circuit.

In the prior art, the Line Boost Valve is acted upon by Torque Signal (hereinafter "TS") pressure and operates against the Reverse Boost Valve and Pressure Regulator spring force to increase line pressure during high load conditions. The Line Boost Valve is actuated in response to changes in throttle position such as during upshifts.

The original equipment manufacture (hereinafter "OEM") Line Boost Valve and Reverse Boost Valve are comprised of steel valve pistons that reciprocate within an aluminum valve sleeve. The mechanical friction of these dissimilar materials causes premature wear, leakage of torque signal pressure, and results in improper upshifting and delayed engagement upon shifting into the Reverse gear range.

Thus, the present invention has been developed to resolve this problem and other shortcomings of the prior art.

SUMMARY OF THE INVENTION

Accordingly, the present invention is a direct replacement Boost Valve Assembly for use in combination with a Pressure Regulator Valve within the valve body of an automatic transmission, which functions to boost line pressure during high load conditions in response to Torque Signal fluid pressure, which is proportional to engine torque.

The present Boost Valve Assembly is comprised of hard-anodized aluminum valve pistons, which are disposed within a wear resistant aluminum sleeve for maximum service longevity. Annular lubrication grooves in the present Boost Valve Assembly provide a lubricating film of ATF to center the valve pistons within the sleeve to ensure accurate operation and to reduce wear. The present valve sleeve also features improved inlet ports to enhance the delivery of TS fluid pressure in order to restore the function of the OEM valve body to its original factory boost ratios and specifications.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
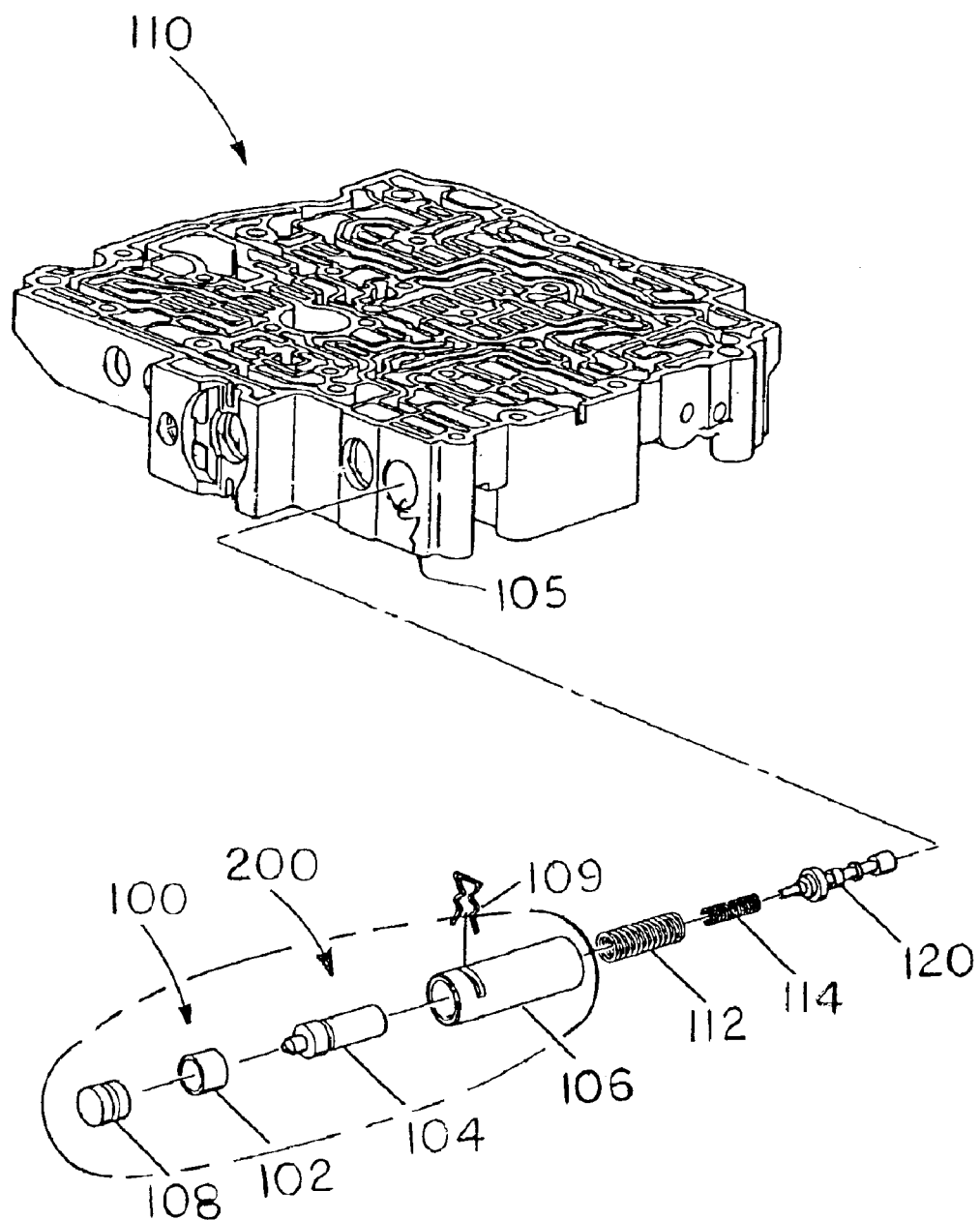
FIG. 1 is a perspective view of the OEM valve body component of a General Motors 4T65E transmission labeled Prior Art and indicating the location of the OEM Line Boost Valve and the OEM Reverse Boost Valve shown in exploded view.

Prior to describing the present invention in detail it may be beneficial to briefly review the structure and function of the prior art Line Boost Valve and Reverse Boost Valve of the General Motors (hereinafter "GM") 4T65E transmission. With reference to the drawings there is shown therein a Line Boost Valve, indicated generally at 100, and a Reverse Boost Valve, indicated generally at 200, in accordance with the prior art and illustrated in FIG. 1. The OEM Line Boost Valve 100 and the Reverse Boost Valve 200 are shown in exploded view and removed from their functional position within a mating bore as at 105, which is machined into the valve body, indicated generally at 110, of the GM 4T65E transmission.

In the prior art the Line Boost Valve 100 comprises a cylindrical valve piston 102 disposed within the valve sleeve 106. The Reverse Boost Valve 200 comprises a generally cylindrical valve piston 104 also disposed within the same valve sleeve 106. The valve pistons 102, 104 are arranged coaxially in end-to-end relation within the bore 105 and secured within the sleeve 106 by an end plug 108 captured by a retaining clip 109. It will be understood that the Line Boost Valve 100 and the Reverse Boost Valve 200 act in conjunction with the Pressure Regulator Valve 120 including compression spring 112 and isolator spring 114 to regulate line pressure within the hydraulic circuits of the GM 4T65E transmission.

Figure 2:
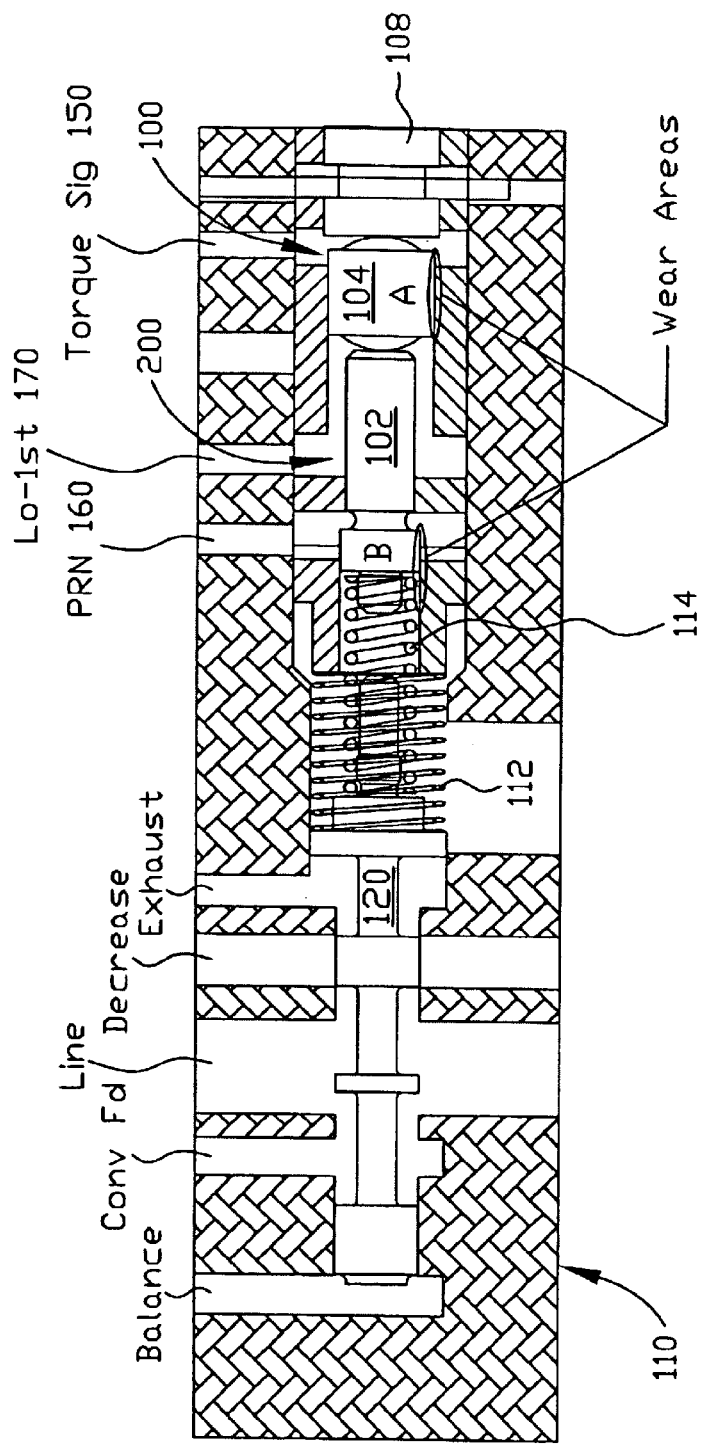
FIG. 2 is a cross-sectional view of the OEM Line Boost Valve and the OEM Reverse Boost Valve shown in their functional positions within a section of the valve body.

In operation the Line Boost Valve 100 responds to TS fluid pressure (as depicted in FIG. 2), which is routed from the Pressure Control Solenoid (PCS) (not shown). Torque Signal fluid pressure as at 150 is generally proportional to engine torque and strokes the Line Boost Valve 100 against the Pressure Regulator isolator spring 114 (i.e. to the left in FIG. 2). The isolator spring 114 then exerts the force from TS fluid pressure to the Pressure Regulator Valve 120 to increase line pressure. The Line Boost Valve 100 is also responsive to Park, Reverse, Neutral fluid pressure and to Low/$1^{st}$ gear fluid pressure when these gear ranges are selected to increase line pressure.

In the prior art Line Boost Valve 100 and Reverse Boost Valve 200 including the valve pistons 102, 104 are fabricated from steel material and the valve sleeve 106 is constructed of aluminum. The mechanical friction between these dissimilar materials during operation results in premature wear within the valve sleeve 106 as shown in FIG. 2. Excessive wear between the sleeve 106 and the valve piston 104 as at area "A" allows TS pressure as at 150 to leak past the Line Boost Valve 100. Because TS pressure is used to boost line pressure during high load conditions such as during upshifts, leakage of TS pressure results in a so-called "soft" upshift, which is especially noticeable during the shift from first to second gear in the GM 4T65E transmission.

Excessive wear between the sleeve 106 and valve piston 102 as at area "B" (FIG. 2) allows Park, Reverse, and Neutral pressure (hereinafter "PRN" pressure) as at 160 to leak past the Reverse Boost Valve 200. PRN pressure is used to boost line pressure in Park, Reverse, and Neutral. When PRN pressure leakage occurs the result is delayed engagement in these gear ranges. The delayed engagement is most noticeable in the Reverse gear range. Thus, the present invention has been developed to resolve the hereinabove described problems and will now be described.

Figure 3:
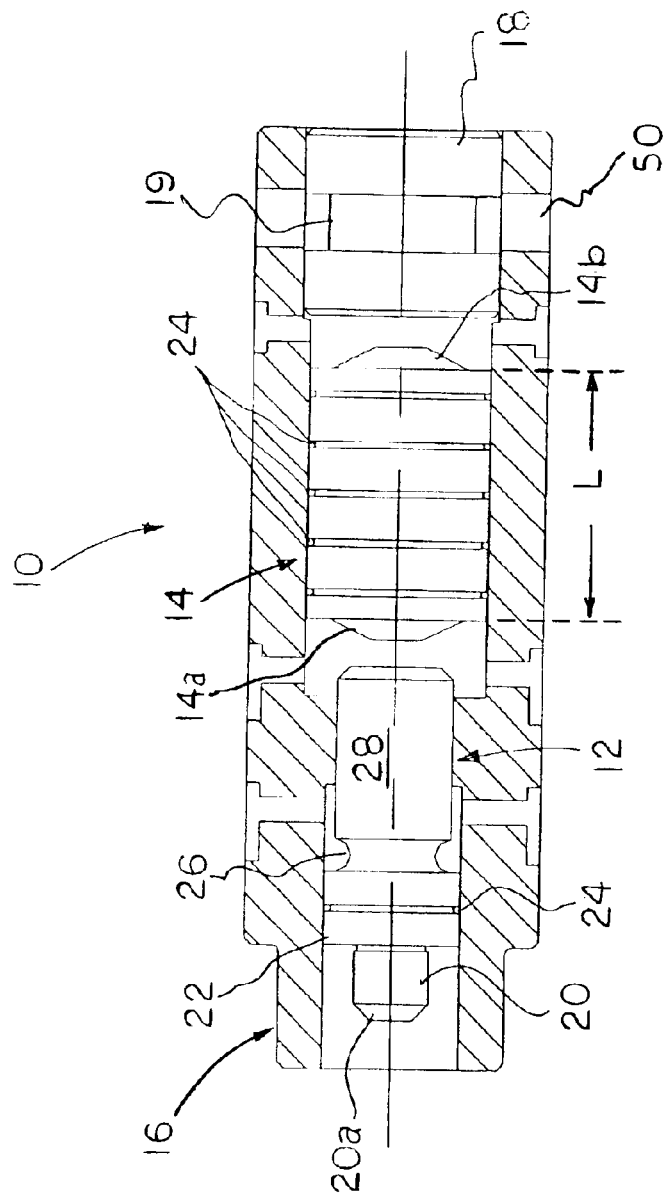
FIG. 3 is a partial cross-sectional view of the present Boost Valve Assembly showing details of the construction thereof.

Referring now to FIG. 3 there is shown therein an improved Boost Valve Assembly in accordance with the present invention, indicated generally at 10. The present Boost Valve Assembly 10 is comprised of a PRN valve piston 12, a TS valve piston 14, a modified valve sleeve 16, and an end plug 18 being arranged for installation within the bore 105 as a direct OEM replacement for the Line Boost valve 100 and Reverse Boost Valve 200 of the prior art.

In the preferred embodiment both the PRN valve piston and the TS valve piston 12, 14 are constructed of ASTM 6262-T8/T9 aluminum, 6061-T6 aluminum in accordance with the American Society of Testing and Materials (ASTM) or other suitable materials for this application. Each valve piston 12, 14 is provided with a hard anodized coating to yield +0.0008/−0.0004 build up per surface, which significantly reduces wear and increases service longevity.

As shown in FIG. 3, the PRN valve piston 12 includes a spring guide diameter 20 of sufficient size to support the OEM isolator spring 114 in the position shown (FIG. 2). The terminal end 20a of spring guide diameter 20 is chamfered to avoid entanglement with isolator spring 114 during installation and to prevent abrasion damage to spring 114 during cycling. An opposite end of spring guide diameter 20 is integrally connected to the major diameter 22, which serves as a seating surface for isolator spring 114. In the preferred embodiment major diameter 22 includes at least one annular groove 24 formed therein to a predetermined depth. Annular groove 24 functions to distribute fluid pressure across the circumference of the major diameter 22 by filling with ATF during operation thereby preventing side loading (i.e. lateral movement) of the valve piston 12 as ATF surges into the valve chamber. Thus, the annular groove 24 effectively centers the PRN valve piston 12 within sleeve 16 substantially reducing friction and wear at area "B" within bore 105 (FIG. 2).

The major diameter 22 is integrally connected via relief groove 26 to the guide diameter 28 formed in coaxial relation thereto. Guide diameter 28 also functions to center the valve piston 12 within the sleeve 16 and provides a contact surface at the end face thereof for the TS valve piston 14. In the preferred embodiment guide diameter 28 has been shortened relative to the OEM design to compensate for an increased overall length of the present TS valve piston 14.

The TS valve piston 14 is a generally cylindrical construction, which resides in the central counterbore 32c of the valve sleeve 16. TS valve piston 14 also includes a plurality of annular grooves 24 formed therein to a predetermined depth, which fill with ATF during operation to prevent side loading and to provide centering of the TS piston 14 within sleeve 16 reducing friction and wear.

The overall length of the TS valve piston 14 as at dimension "L" (FIG. 3) has been substantially increased in comparison to the OEM Line Boost Valve 104 to maximize the contact surface area between the TS valve piston 14 and the mating sleeve 16 to minimize any leakage potential. The increased overall length of the TS valve piston 14 also permits the maximum number of annular grooves 24, which serve to center the piston 14 within sleeve 16 and to resist side loading as described hereinabove.

It can be seen that the TS piston 14 includes generally convex protuberances 14a, 14b integrally formed on the opposite end faces thereof. In general, the hemispherical protuberances 14a, 14b provide an optimal ATF reaction surface having an increased surface area, which improves the response and accuracy of the present valve assembly 10. In addition, the protuberance 14a provides a contact surface for the transfer of ATF pressure from the TS valve piston 14 to the PRN valve piston 12. The protuberance 14b also serves to stop the TS valve piston 14 as it comes into contact with the end plug 18 and to provide an improved reaction surface for ATF entering from the TS fluid circuit as at 150 (FIG. 2).

Figure 4A:
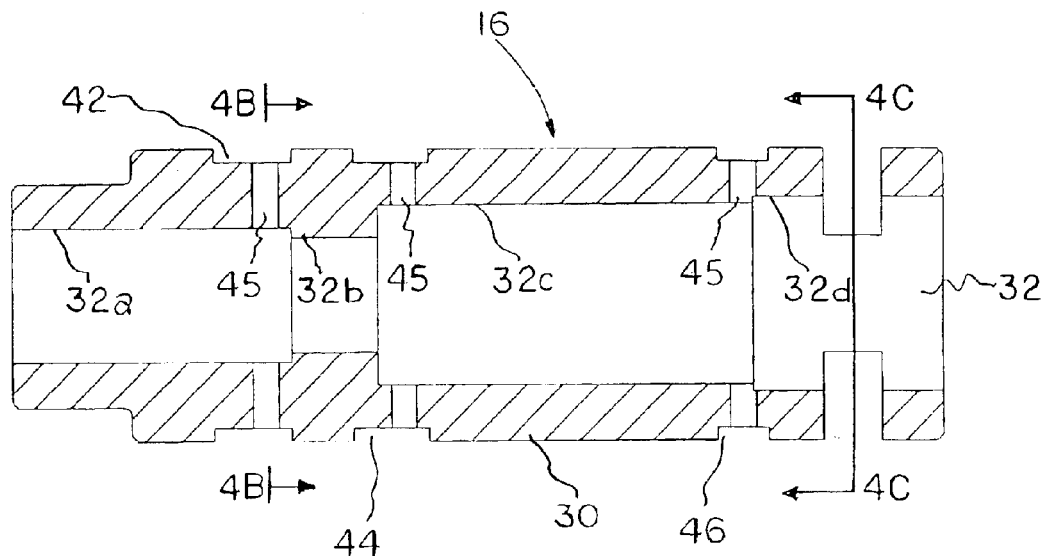
FIG. 4A is a longitudinal cross-section of the valve sleeve of the present invention.
Figure 4B:
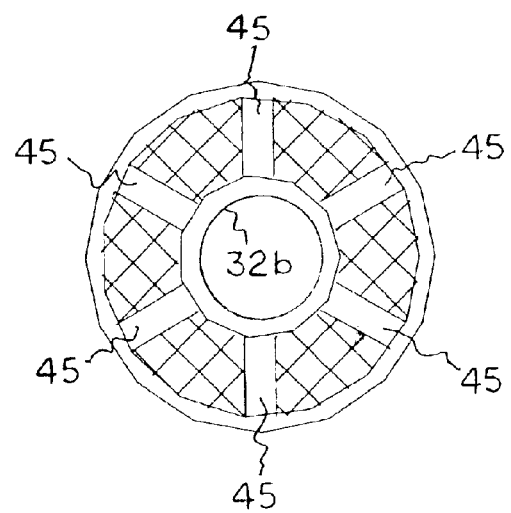
FIG. 4B is a cross-sectional view of the present valve sleeve taken along section line 4B—4B of FIG. 4A.
Figure 4C:
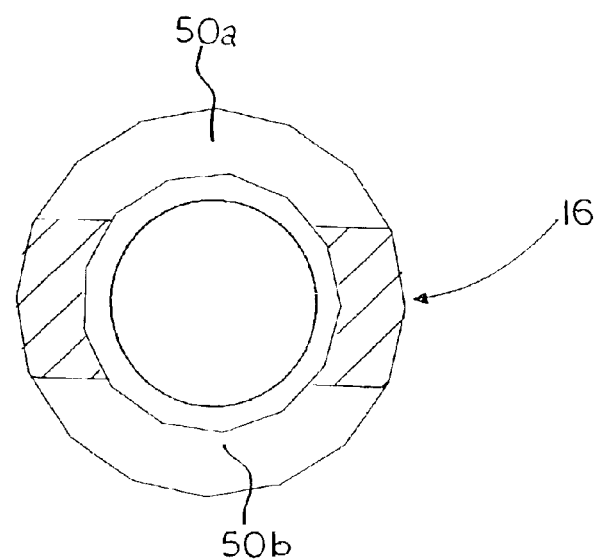
FIG. 4C is a cross-sectional view of the present valve sleeve taken along section line 4C—4C of FIG. 4A.

FIGS. 4A–4C illustrate the present valve sleeve 16 showing its structural features in further detail. The valve sleeve 16 is constructed of 4032-T651/T86 aluminum. This type of aluminum material has been selected after extensive testing and has been demonstrated to provide optimal wear characteristics when used in combination with the hard anodized finish applied to the valve pistons 12, 14 in accordance with MIL-A-8625, Type III, Class 2.

Referring to FIG. 4A sleeve 16 is comprised of a cylindrical body 30 including a central bore 32 having multiple counterbores 32a, 32b, 32c, and 32d being dimensioned to receive the major diameter and guide diameter 22, 28 of the PRN valve piston 12, the TS valve piston 14, and the end plug 18 respectively. In the preferred embodiment the axial length of the counterbore 32b has been increased in comparison to the OEM sleeve 106 to provide enhanced support for the guide diameter 28 of PRN valve piston 12. Sleeve 16 also includes a plurality of ATF distribution channels 42; 44, and 46 formed about its circumference, which function as conduits for the delivery of ATF to the PRN fluid circuits, the Low-$1^{st}$ fluid circuit 170, and the Torque Signal circuit 150 respectively. Each channel 42, 44, and 46 includes a plurality of fluid ports 45 formed therein at predetermined radial locations, which extend through the sleeve body 30 in fluid communication with the counterbores 32a and 32c to increase the flow of ATF during valve operation.

In the preferred embodiment an array of six ports 45 radially oriented at 60 degree angles to each other are formed within each channel 42, 44, and 46 as shown in FIG.

4B. In this configuration the flow of ATF is distributed via channels 42, 44, 46 to ports 45 under line pressure and enters the valve sleeve 16 about the entire circumference thereof to ensure even lubrication of the present valve pistons 12, 14 thereby reducing premature wear at areas "A" and "B" as described hereinabove (FIG. 2).

The sleeve body 30 also includes a retaining clip aperture 50 formed therein for the reinsertion of the OEM retaining clip 109 into the retaining clip groove 19 of the end plug 18 as most clearly shown in FIG. 4C. In the preferred embodiment aperture 50 is constructed by machining a pair of horizontally opposed slots 50a, 50b through the sidewall of sleeve 16 as illustrated.

Figure 5A:
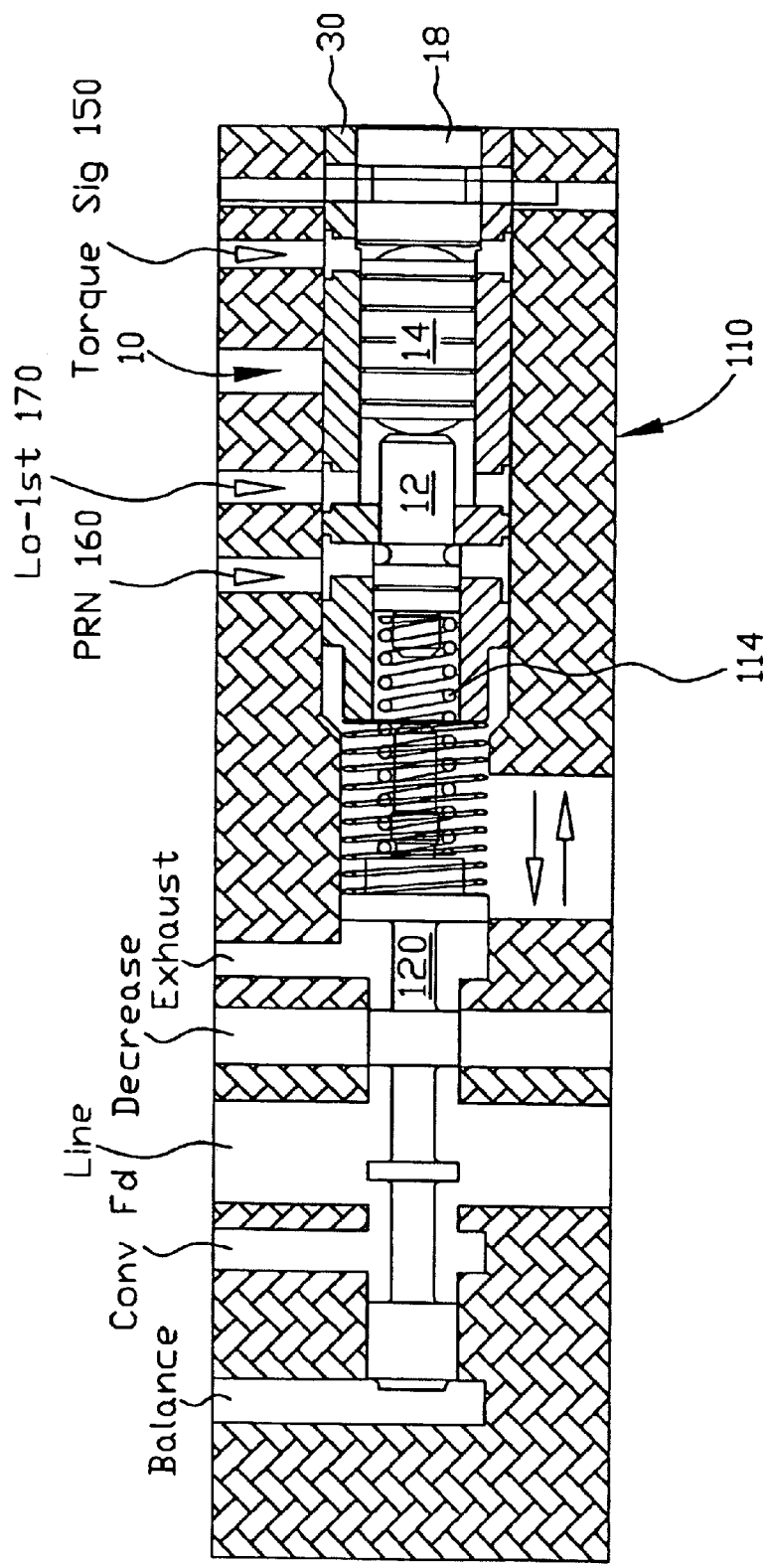
FIG. 5A is a longitudinal cross-section of the present Boost Valve Assembly shown in its closed position within the valve body.
Figure 5B:
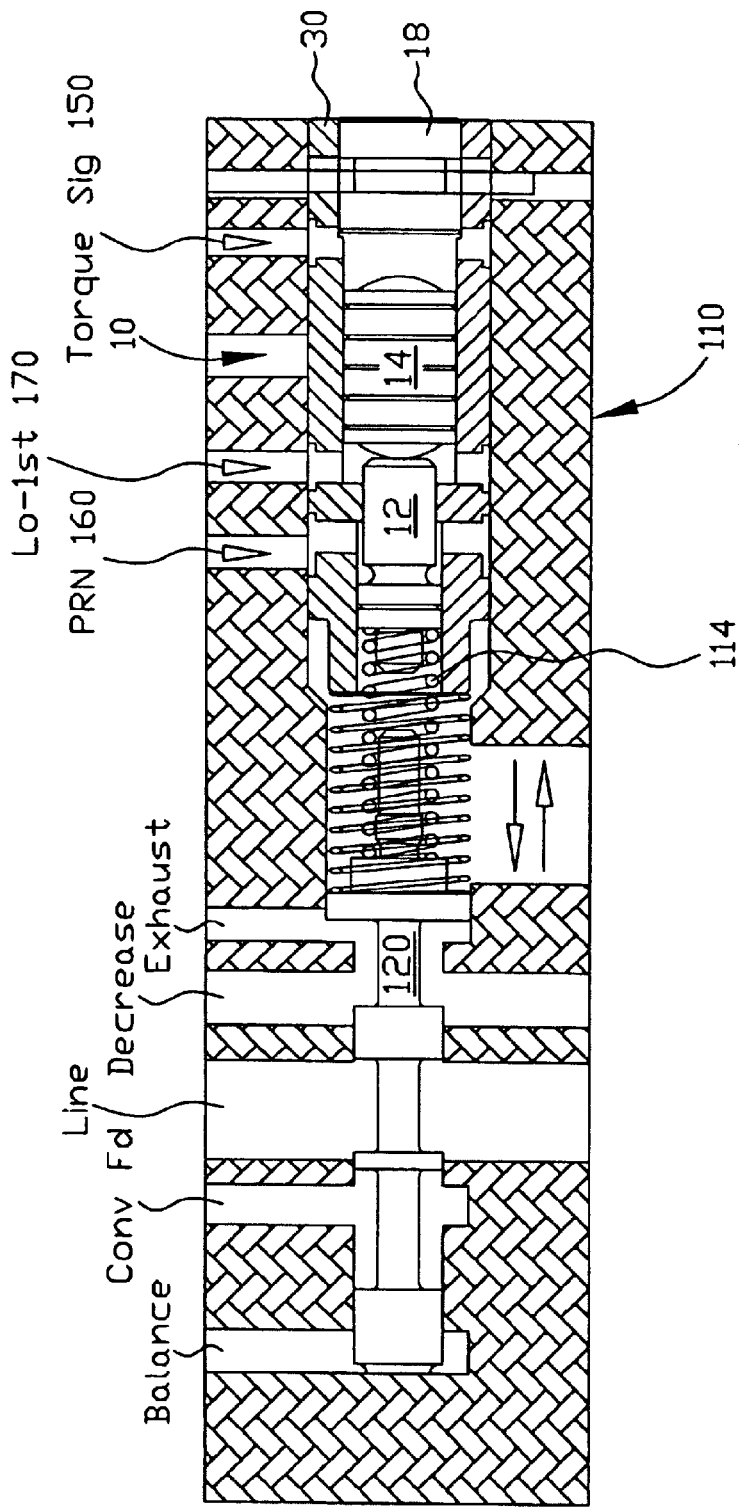
FIG. 5B is a longitudinal cross-section of the present Boost Valve Assembly shown in its open position within the valve body.

With reference to FIGS. 5A–5B, the operation of the present Boost Valve Assembly 10 will now be described. The present Boost Valve Assembly 10 is normally spring-biased to the rest position as shown in FIG. 5A by the force of the Pressure Regulator isolator spring 114. During high load conditions such as upshifting, the Boost Valve Assembly 10 responds to TS fluid pressure as at 150 routed from the Pressure Control Solenoid (not shown). TS fluid pressure is proportional to engine torque and strokes the Boost Valve Assembly 10 against the force of the Pressure Regulator isolator spring 114 as shown in FIG. 5B. The isolator spring 114 continues to exert the force generated by TS fluid pressure to the Pressure Regulator Valve 120 thereby increasing its output. Thus, the Pressure Regulator Valve 120 increases line pressure as throttle position and engine torque increase. When the upshift is completed and line pressure returns to normal operating levels, the Boost Valve Assembly 10 returns to the rest condition as shown by directional arrows in FIGS. 5A–5B.

Still referring to FIGS. 5A–5B, the PRN valve piston 12 is also acted upon by PRN fluid pressure as at 160 from the manual valve (not shown) and by Low/$1^{st}$ fluid as at 170 and moves against the isolator spring 114 to actuate the valve assembly when these gear ranges are selected. This increases line pressure in Park, Reverse, Neutral, and Manual $1^{st}$ gear.

Although not specifically illustrated in the drawings, it should be understood that additional equipment and structural components will be provided as necessary and that all of the components described above are arranged and supported in an appropriate fashion to form a complete and operative Boost Valve Assembly incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A replacement boost valve assembly for use in combination with a pressure regulator valve assembly wherein the boost valve assembly is disposed in fluid communication with a plurality of hydraulic circuits within the valve body of an automatic transmission, said boost valve assembly comprising:
   a generally cylindrical valve sleeve disposed in the valve body in coaxial relation to the pressure regulator valve assembly;
   a torque signal valve piston disposed in said valve sleeve in fluid communication with a torque signal fluid circuit, said torque signal valve piston having an increased axial length in comparison to the original equipment torque signal valve piston without a corresponding increase in the overall axial length of said boost valve assembly,
   a park/reverse/neutral valve piston disposed in fluid communication with a park/reverse/neutral fluid circuit, said park/reverse/neutral valve piston being positioned intermediate said torque signal valve piston and the pressure regulator valve; and
   at least one compression spring disposed intermediate said torque signal valve piston and said park/reverse/neutral valve piston in coaxial relation thereto, said compression spring biasing said torque signal valve piston to a closed position, said torque signal valve piston transferring the force generated by fluid pressure from said torque signal fluid circuit to the pressure regulator valve during high load conditions.

2. The boost valve assembly of claim 1 wherein said valve sleeve includes a plurality of circumferential channels formed therein at predetermined axial locations corresponding to the positions of said hydraulic circuits within the valve body including said torque signal fluid circuit and said park/reverse/neutral fluid circuit, said circumferential channels delivering the flow of hydraulic fluid about the circumference of said valve sleeve.

3. The boost valve assembly of claim 2 wherein at least one of said circumferential channels includes a plurality of fluid ports formed therein in fluid communication with said torque signal fluid circuit, said fluid ports being disposed at predetermined radial locations within said at least one circumferential channel to increase the flow of fluid pressure from said torque signal fluid circuit into said boost valve assembly.

4. The boost valve assembly of claim 3 wherein an array of six fluid ports is formed at angular intervals of sixty degrees within said at least one circumferential channel.

5. The boost valve assembly of claim 2 wherein at least one of said circumferential channels includes a plurality of fluid ports formed therein in fluid communication with said park/reverse/neutral fluid circuit, said fluid ports being disposed at predetermined radial locations within said at least one circumferential channel to increase the flow of fluid pressure from said park/reverse/neutral fluid circuit into said boost valve assembly.

6. The boost valve assembly of claim 5 wherein an array of six fluid ports is formed at angular intervals of sixty degrees within said at least one circumferential channel.

7. The boost valve assembly of claim 1 wherein said torque signal valve piston includes a plurality of annular grooves formed about the circumference thereof at regular intervals, said grooves functioning to retain a lubricating film during operation to center said valve piston within its mating bore to prevent side loading of said valve piston.

8. The boost valve assembly of claim 7 wherein said torque signal valve piston includes a convex protuberance formed on a first end face thereof to provide a reaction surface having an increased surface area for exposure to said torque signal fluid pressure.

9. The boost valve assembly of claim 1 wherein said valve sleeve is constructed of wear resistant aluminum in accordance with ASTM 4032-T651/T86.

10. The boost valve assembly of claim 9 wherein said torque signal valve piston and said park/reverse/neutral valve piston are coated with a hard anodized finish applied in accordance with MIL-A-8625, Type III, Class 2, to provide optimal wear characteristics with said valve sleeve.

11. An improved boost valve assembly for use in combination with a pressure regulator valve within the valve body of an automatic transmission, wherein the original equipment boost valve assembly comprises a torque signal valve piston responsive to fluid pressure from the torque signal fluid circuit and a park/reverse/neutral valve piston responsive to park/reverse/neutral fluid pressure from the park/reverse/neutral fluid circuit, said valve pistons positioned within a valve sleeve in end-to-end relation with the pressure regulator valve, wherein the improvement comprises:

a replacement torque signal valve piston having an increased axial length in comparison to the original equipment torque signal valve piston without a corresponding increase in the overall axial length of the original equipment boost valve assembly;

a plurality of circumferential channels formed about said valve sleeve at predetermined axial locations corresponding to the positions of said torque signal fluid circuit and said park/reverse/neutral fluid circuit, said circumferential channels delivering the flow of hydraulic fluid about the circumference of said valve sleeve; and an array of fluid ports formed within each of said circumferential channels in fluid communication with said torque signal valve piston and said park/reverse/neutral valve piston to increase the flow of fluid pressure from said torque signal fluid circuit and said park/reverse/neutral fluid circuit into said boost valve assembly.

12. The improved boost valve assembly of claim 11 wherein said torque signal valve piston includes a plurality of annular grooves formed about the circumference thereof at regular intervals, said grooves functioning to retain a lubricating film during operation to center said valve piston within its mating bore to prevent side loading of said valve piston.

13. The improved boost valve assembly of claim 12 wherein said torque signal valve piston includes a convex protuberance formed on a first end face thereof to provide a reaction surface having an increased surface area for exposure to said torque signal fluid pressure.

14. The improved boost valve assembly of claim 11 wherein said valve sleeve is constructed of wear resistant aluminum in accordance with ASTM 4032-T651/T86.

15. The improved boost valve assembly of claim 14 wherein said torque signal valve piston and said park/reverse/neutral valve piston are coated with a hard anodized finish applied in accordance with MIL-A-8625, Type III, Class 2, to provide optimal wear characteristics with said valve sleeve.

* * * * *